United States Patent
Wu et al.

(10) Patent No.: US 8,081,090 B2
(45) Date of Patent: Dec. 20, 2011

(54) METHOD OF TRANSMITTING KEY CODE OF HOT KEY FROM NUMBER PAD

(75) Inventors: Yen-Chun Wu, Chung Ho (TW); Li-Chun Huang, Chung Ho (TW)

(73) Assignee: Ortek Technology, Inc., Chung Ho, Taipei Hsien (TW)

( * ) Notice: Subject to any disclaimer, the term of this patent is extended or adjusted under 35 U.S.C. 154(b) by 1035 days.

(21) Appl. No.: 12/000,813

(22) Filed: Dec. 18, 2007

(65) Prior Publication Data
US 2009/0153372 A1      Jun. 18, 2009

(51) Int. Cl.
*H03M 11/00* (2006.01)
(52) U.S. Cl. .................. 341/22; 341/20; 710/67; 704/8
(58) Field of Classification Search .............. 700/83, 700/84, 86; 710/1, 5, 72, 73, 67; 341/20–35; 345/171; 704/1, 5, 8
See application file for complete search history.

(56) References Cited

U.S. PATENT DOCUMENTS

| | | | |
|---|---|---|---|
| 6,445,381 B1 * | 9/2002 | Chou | 345/168 |
| 6,574,517 B1 * | 6/2003 | Park et al. | 700/84 |
| 2003/0210232 A1 * | 11/2003 | Chen | 345/168 |

* cited by examiner

*Primary Examiner* — George Bugg
*Assistant Examiner* — Franklin Balseca
(74) *Attorney, Agent, or Firm* — Bacon & Thomas, PLLC

(57) ABSTRACT

In a method of transmitting key codes of hot keys from a number pad, the number pad includes at least one hot key and several key code sets corresponding to the hot keys. Each key code set has key codes formed and edited according to a first key code conversion table and a predetermined sequence. When a hot key is pressed, the number pad transmits all key codes to an electronic device according to the predetermined transmitting sequence. The electronic device reads each key code by the first encoding format. The key codes are converted into characters corresponding to the first key code conversion table according to the first key code conversion table, and also into characters corresponding to the second key code conversion table according to the second key code conversion table in a second encoding format, such that the electronic device produces expected conversion results.

7 Claims, 9 Drawing Sheets

ASCII Code Conversion Table

| Decimal | Character or Function Key | Decimal | Character or Function Key | Decimal | Character or Function Key | Decimal | Character or Function Key |
|---|---|---|---|---|---|---|---|
| 0 | NUL | 32 | SPACE | 64 | @ | 96 | ` |
| 1 | SOH | 33 | ! | 65 | A | 97 | a |
| 2 | STX | 34 | " | 66 | B | 98 | b |
| 3 | ETX | 35 | # | 67 | C | 99 | c |
| 4 | EOT | 36 | $ | 68 | D | 100 | d |
| 27 | ESC | 59 | ; | 91 | [ | 123 | { |
| 28 | FS | 60 | < | 92 | \ | 124 | | |
| 29 | GS | 61 | = | 93 | ] | 125 | } |
| 30 | RS | 62 | > | 94 | ^ | 126 | ~ |
| 31 | US | 63 | ? | 95 | _ | 127 | DEL |

FIG. 7

METHOD OF TRANSMITTING KEY CODE OF HOT KEY FROM NUMBER PAD

FIELD OF THE INVENTION

The present invention relates to a method of transmitting key codes of hot keys from a number pad, and more particularly to a method of transmitting key codes of hot keys from a number pad correctly regardless of the language input method of the number pad.

BACKGROUND OF THE INVENTION

Number pad is one of the input devices of a computer and generally comes with a plurality of keys and at least one character such as a letter, a number or a punctuation mark printed on the keys. In most situations, a display device of the computer is used for outputting a character corresponding to the character printed on a key if such key is pressed. However, some special symbols require users to press several keys simultaneously, or press several keys one at a time sequentially before the display device can display the characters. We usually call it as "combination key". In addition, there are some keys that do not correspond to a letter, a number or a punctuation mark, but these keys including the function keys with characters or symbols of "F1"~"F12", "Esc", "→", "Enter" and "Alt" control the operations of a computer. In addition, different input methods in an operating system of the computer define different characters that are provided for users to use in a language familiar to them. Users can input characters into a computer by pressing the corresponding keys on the number pad and control the operations of the computer by pressing the corresponding function keys.

In recent years, number pad manufacturers provide a way of expediting the input of a character or a function key to provide users a quick way of starting a corresponding application program by pressing "hot keys" on the number pad. The so-called "hot keys" refer to the keys for executing special functions of a certain application program by pressing one of the hot keys in the number pad, and then the number pad issues key codes corresponding to a series of keys, so as to save the time for users to press different keys for a number of times. In addition, there are many resident programs that can be started by using hot keys. Resident programs are generally divided into two types: an application program operated at a fixed time or started by another application program such as a font driver (which is not related to a hot key), and an application program whose specific functions such as starting the "Excel" program, a figure capture function of a drawing program, or a number pad on the screen of the "WORD" program can be started by a user who presses a certain combination of keys, The specific combination of keys pressed by users is called a "combination key" as mentioned above, and the difference between a "hot key" and a "combination key" is given below:

1. "Combination key" refers to a way of achieving the same effect of pressing several keys simultaneously, or pressing several keys sequentially by users, before a display device can output a display; and 2. "Hot key" refers to a way of sending out at least one key code according to a predetermined sequence, and the key codes are set by a number pad manufacturer in advance, so that the key codes will be sent to an electronic device to open an application program or a specific function of the electronic device, and the "combination key" can be set as a "hot key", so that after a user presses the "hot key", the key code of the "combination key" and the transmitting sequence will be inputted to an electronic device that is connected to the number pad to display the specific characters or open an application program or a specific function of an application program corresponding to the "combination key".

For example, a "Cordless Number Pad for Notebooks" manufactured by Logitech has three hot keys: "Excel", "Calculator" and "Web" provided for users to start a Microsoft Office application program "Excel", the application program "Calculator" and the "Internet Explorer" bundled into the Microsoft operating system respectively. If the "Cordless Number Pad for Notebooks" connected to an operating system of an electronic device is under a non-English language input method and a user presses the "Excel" hot key of the "Cordless Number Pad for Notebooks", then the "Cordless Number Pad for Notebooks" will issue the following key codes in sequence by a USB HID encoding format of an English USB number pad:

(1) "E7" (which stands for inputting a "START" function key to start the "START" window of an operating system of the electronic device);

(2) "15" (After the previous key code is inputted, the "START" window has been started, so that an input of alphabet "R" in the "START" window stands for an operation of starting the "EXECUTE" window of the operation system of the electronic device);

(3) "08" (Input an alphabet "E" in the "START" field of the "EXECUTE" window);

(4) "1B" (Input an alphabet "X" in the "START" field of the "EXECUTE" window);

(5) "06" (Input an alphabet "C" in the "START" field of the "EXECUTE" window);

(6) "08" (Input an alphabet "E" in the "START" field of the "EXECUTE" window);

(7) "0F" (Input an alphabet "L" in the "START" field of the "EXECUTE" window); and (8) "28" (which stands for an input of "ENTER" function key).

After the "Excel" hot key is pressed, the Microsoft Office application program "Excel" will be executed, and users simply press the keys printed with characters as shown in the abovementioned procedure to achieve the purpose of saving the time of pressing the keys for many times.

However, if the operating system of the electronic device is under a non-English language input method and the "Excel" hot key of the "Cordless Number Pad for Notebooks" is pressed, then the Microsoft Office application program "Excel" will be unable to open, and the screen as shown in FIG. 1 will appear in a Chinese phonetic input method; the screen as shown in FIG. 2 will appear in a Russian language input method; the screen as shown in FIG. 3 will appear in a Greek language input method; or a screen as shown in FIG. 4 will appear in a Japanese language input method. The cause for the operating system of the electronic device to have wrong conversions of this sort resides on that when the operating system of the electronic device is at a non-English language input method, the "Cordless Number Pad for Notebooks" sequentially transmits key codes formed and edited in a USB HID encoding format of a USB number pad, and the operating system of the electronic device converts the key codes by the current non-English language input method, and thus the key codes are converted into the characters of the current non-English language input method, and the characters of the non-English language input method cannot be inputted into the "START" field A of the "Excel" or after the "START" window is started, and the "EXECUTE" window cannot be opened, and the Microsoft Office application program "Excel" cannot be executed. Therefore, finding a way of starting an application program installed in an electronic device successfully by a hot key on a number pad demands immediate attentions and feasible solutions.

SUMMARY OF THE INVENTION

In view of the shortcomings of the prior art, the inventor of the present invention based on years of experience in the related industry to conduct extensive researches and experiments, and finally invented a method of transmitting a key code of a hot key from a number pad in accordance with the present invention to overcome the aforementioned shortcomings and solve the problem caused by converting a key code outputted by a hot key of a number pad into a different result when the operating system of the electronic device is under a different language input method.

It is a primary objective of the present invention to provide a method of transmitting a key code of a hot key from a number pad, applied in a number pad, and the number pad comprises at least one hot key and a plurality of key code sets, wherein each key code set corresponds to one of the hot keys, and each key code set includes a plurality of key codes, and the key codes are formed and edited by a first key code conversion table of a first encoding format and a predetermined transmitting sequence. If any hot key of the number pad is pressed, all key codes of the key code set corresponding to the pressed hot key of the number pad are transmitted sequentially to an electronic device that is connected to the number pad according to the transmitting sequence of the key codes. Until the electronic device has read every key code according to the first encoding format, the key codes are converted into characters corresponding to the first key code conversion table according to the first key code conversion table, and some characters can be converted into characters corresponding to the second key code conversion table according to the second key code conversion table of the second encoding format, so that the electronic device can open an application installed in the electronic device simply by reading the characters converted by the first key code conversion table and the characters converted by the first and second key code conversion tables. Regardless of the language input method of the operating system of the electronic device, each key code set transmitted from the number pad will not be converted into a different result by the operating system, so that the number pad can start an application program correctly.

BRIEF DESCRIPTION OF THE DRAWINGS

FIG. 7 is a schematic view of a portion of an ASCII conversion table;

DETAILED DESCRIPTION OF THE PREFERRED EMBODIMENTS

Figure 1:
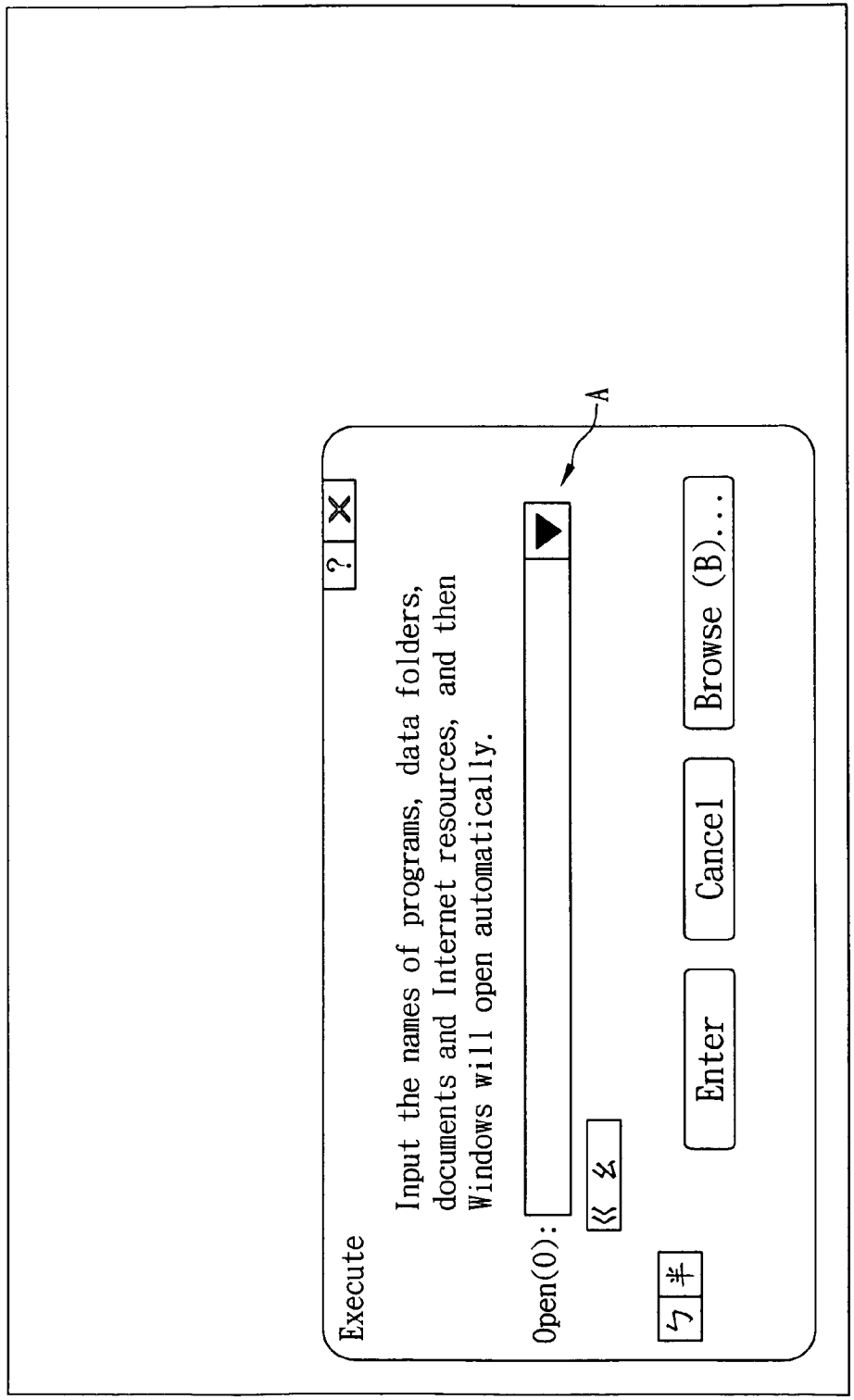
FIG. 1 is a schematic view of a character being inputted into a start field when the "Excel" hot key is pressed under a Chinese phonetic input method of a "Cordless Number Pad for Notebooks" of a prior art.
Figure 2:
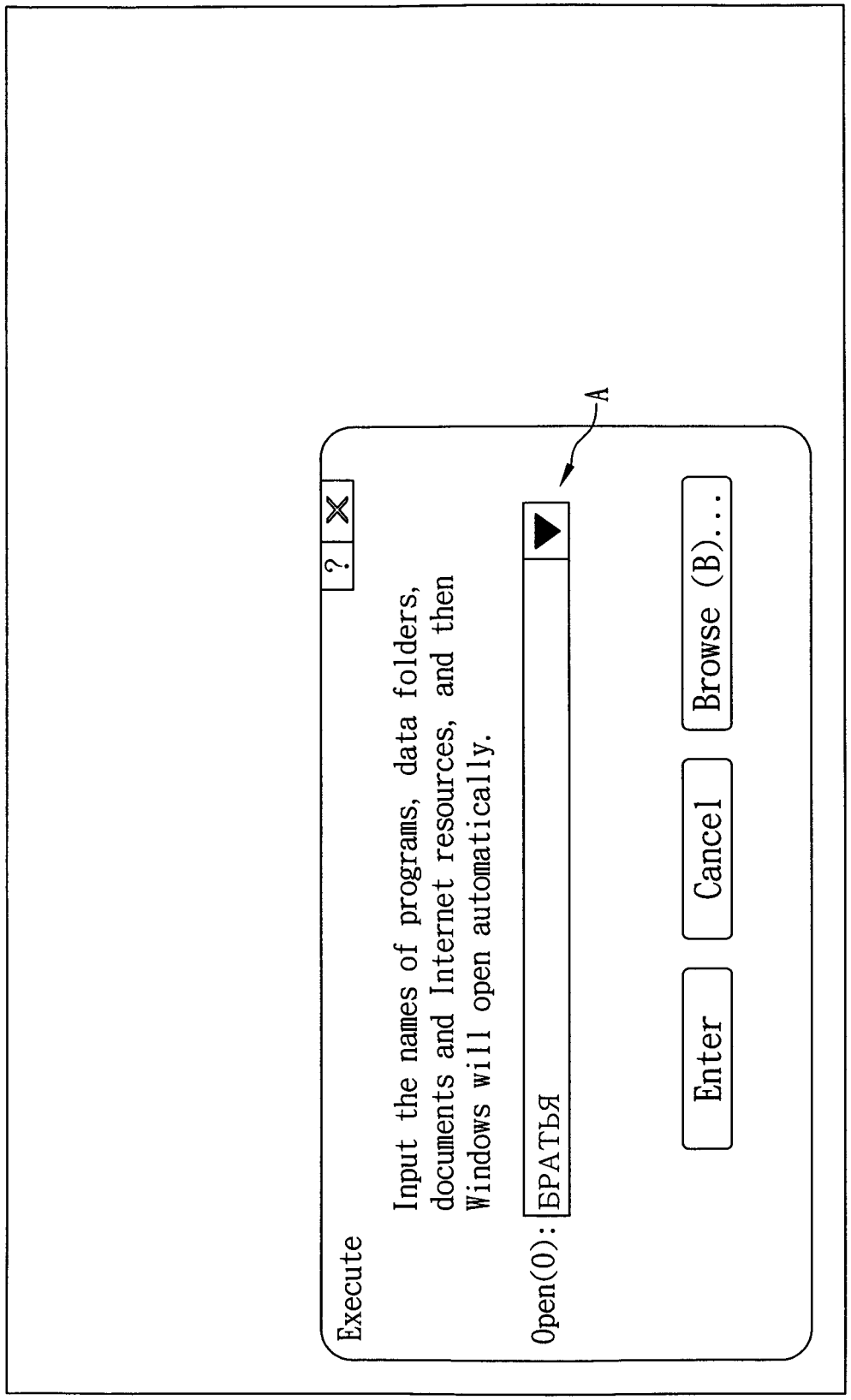
FIG. 2 is a schematic view of a character being inputted into a start field when the "Excel" hot key is pressed under a Russian phonetic input method of a "Cordless Number Pad for Notebooks" of a prior art.
Figure 3:
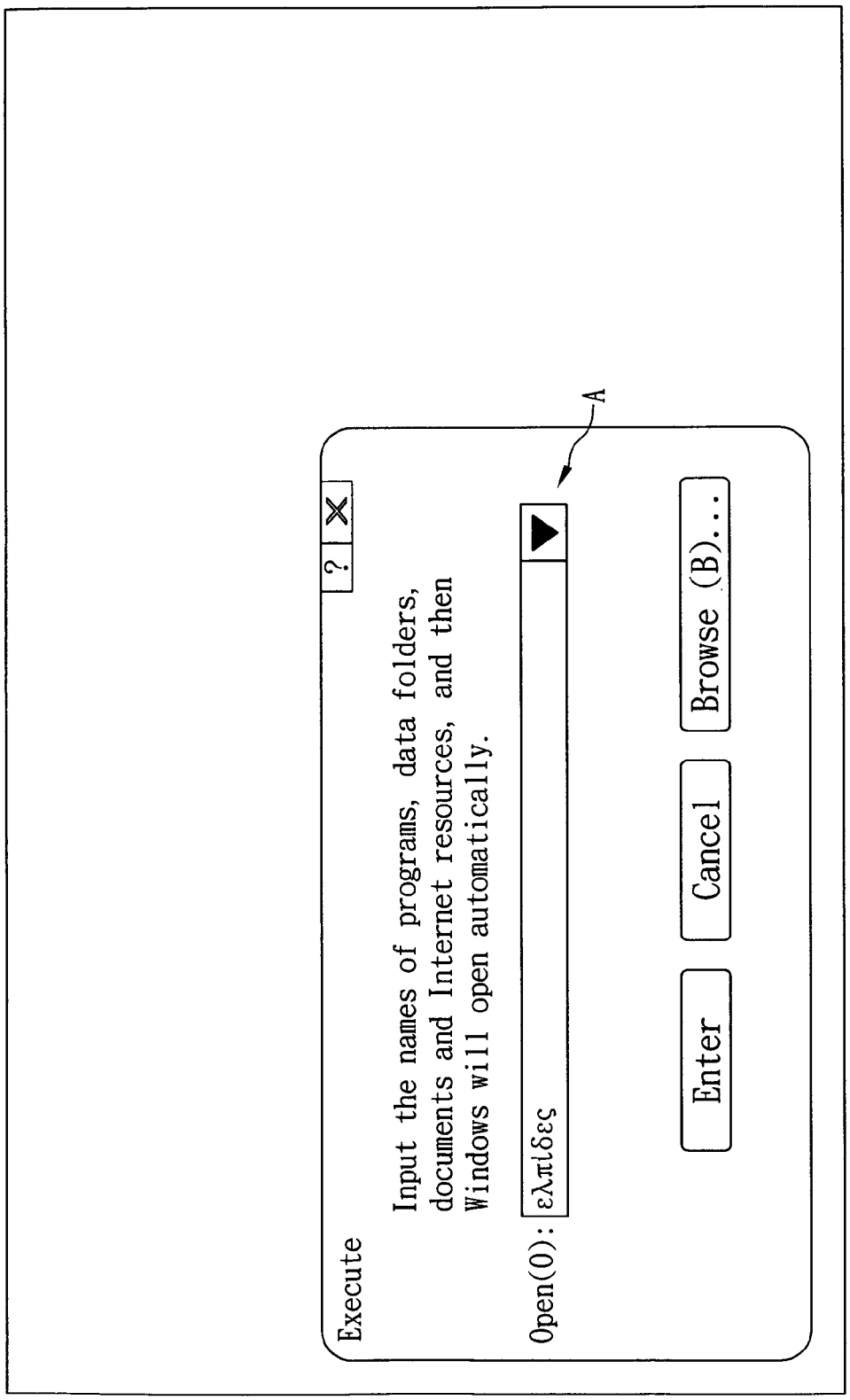
FIG. 3 is a schematic view of a character being inputted into a start field when the "Excel" hot key is pressed under a Greek phonetic input method of a "Cordless Number Pad for Notebooks" of a prior art.
Figure 4:
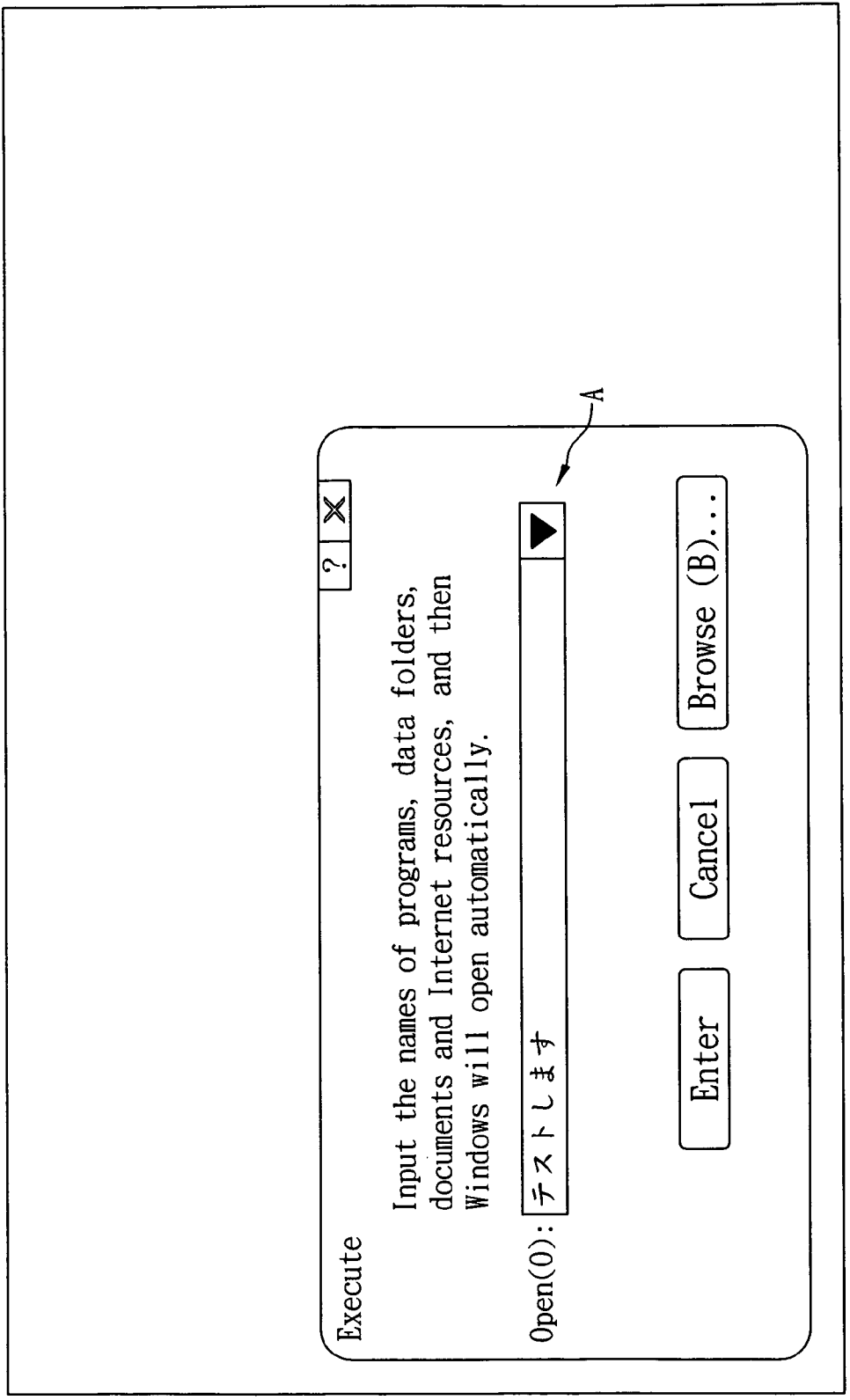
FIG. 4 is a schematic view of a character being inputted into a start field when the "Excel" hot key is pressed under a Japanese phonetic input method of a "Cordless Number Pad for Notebooks" of a prior art.
Figure 5:
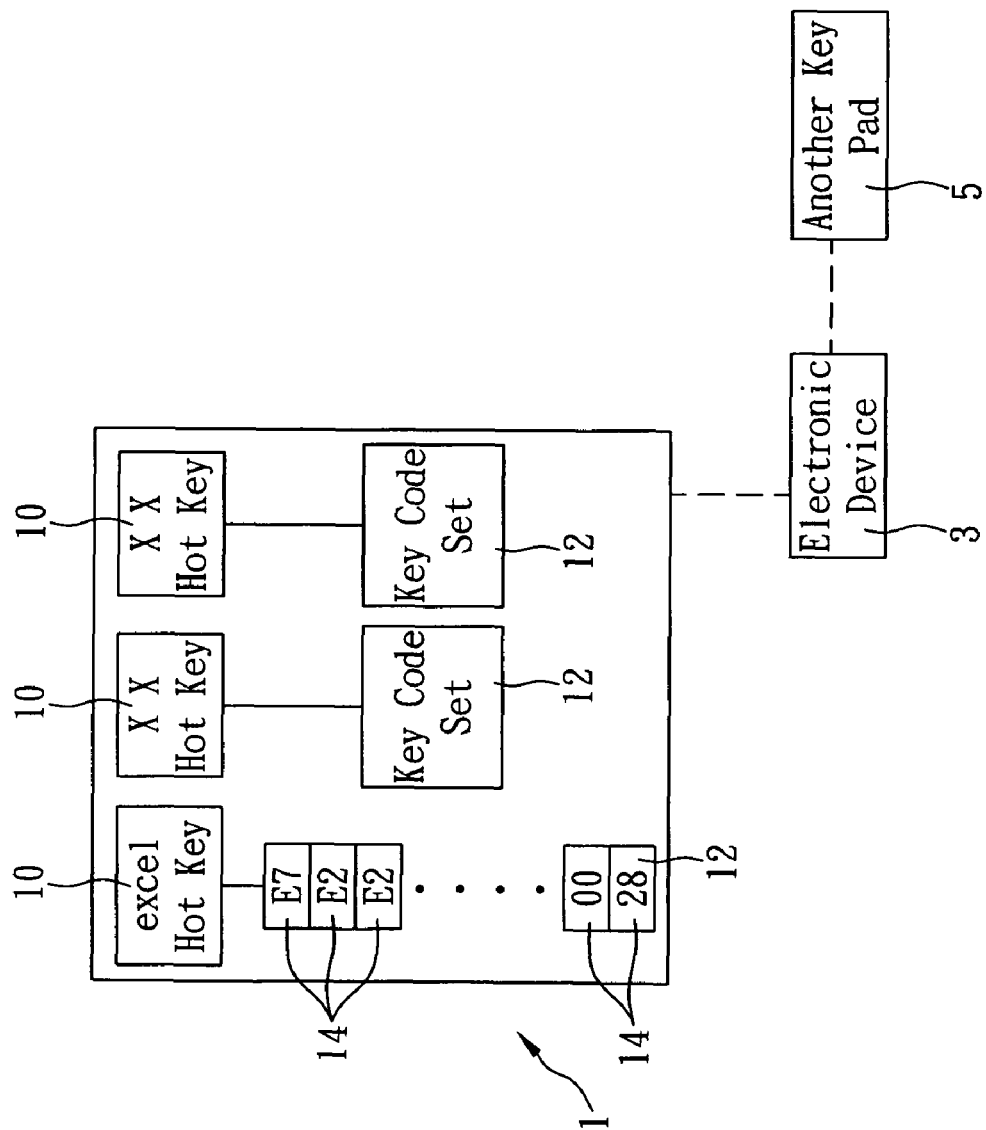
FIG. 5 is a schematic view of a number pad structure of the present invention.
Figure 6:
FIG. 6 is a schematic view of a portion of an USB HID conversion table.

The present invention relates to a method of transmitting a key code of a hot key from a number pad as shown in FIG. 5 and the method is applied in a number pad 1, and the number pad 1 installs at least one hot key 10, and a plurality of key code sets 12, and each key code set 12 corresponds to one of hot keys 10, and each key code set 12 includes a plurality of key codes 14, and the key codes 14 are set sequentially in advance and formed and edited according to a first key code conversion table 2 (as shown in FIG. 6) of a first encoding format. If any hot key 10 of the number pad 1 is pressed, all key codes 14 of the key code set 12 corresponding to the pressed hot key 10 are transmitted sequentially to an electronic device 3 that is connected to the number pad 1 in advance according to the key codes 14, and then the electronic device 3 converts the key codes 14 read by the first encoding format into characters corresponding to the first key code conversion table 2 according to the first key code conversion table 2, and the electronic device further converts a plurality of characters into characters corresponding to the second key code conversion table 4 according to the second key code conversion table 4 of the second key code (as shown in FIG. 7), so as to avoid the key codes 14 from being converted by the current language input method of the operating system of the electronic device 3, and to produce an expected conversion result simply by using the electronic device 3 to read characters formed and converted by the first key code conversion table 2, and read characters converted by the first and second key code conversion tables 2, 4 in order to open an application program installed in the electronic device 3. Regardless of the language input method of the operating system of the electronic device 3, each key code set 12 transmitted from the number pad 1 will not be converted into the key code 14 by the current language input method of the operating system, so that the key code 14 will not be converted into a different conversion result, and the number pad 1 can start an application program correctly.

Figure 8:
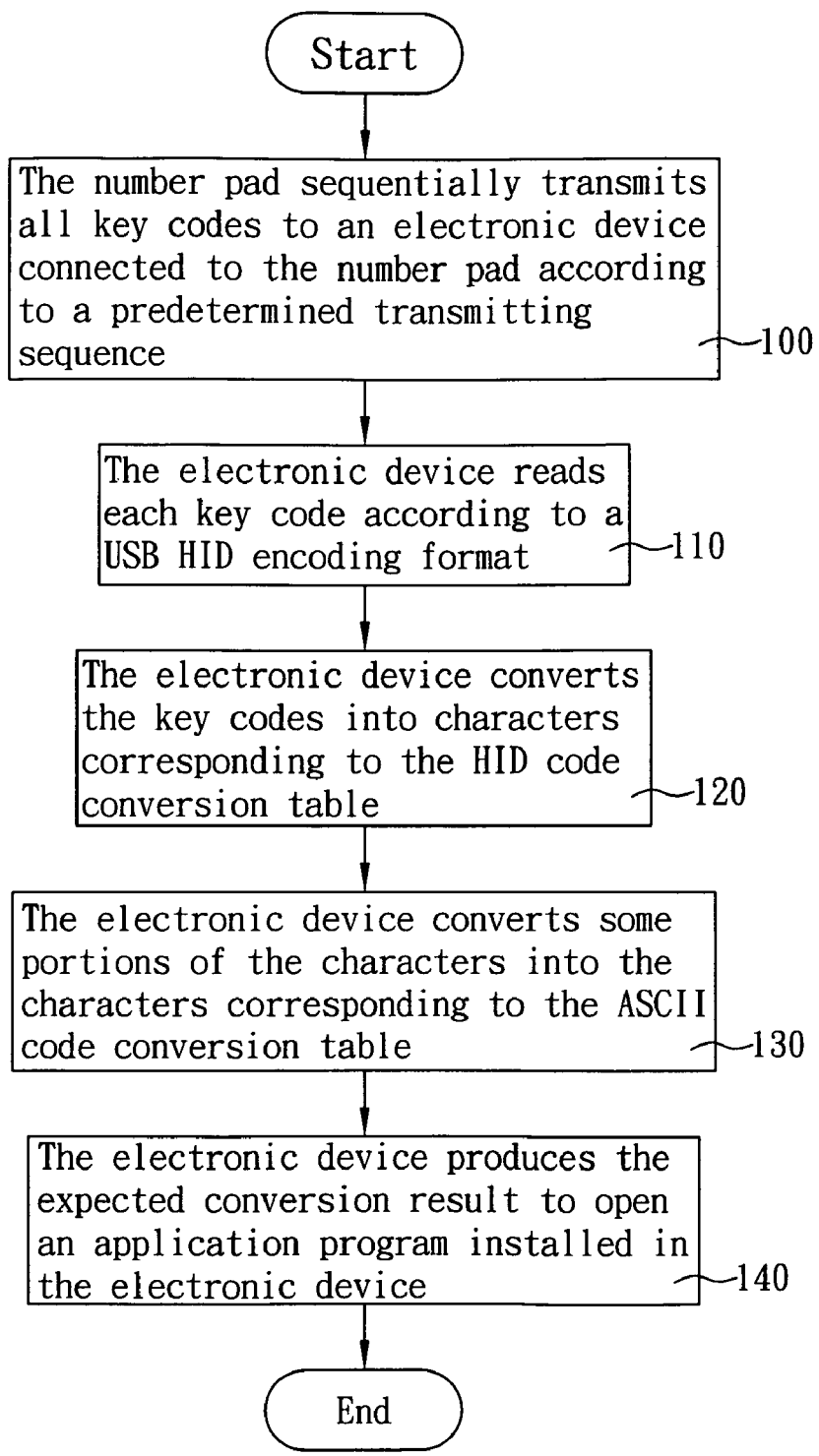
FIG. 8 is a schematic view of converting characters to a key code set by a USB HID conversion table and an ASCII conversion table in accordance with the present invention.

In a preferred embodiment of the present invention, the first encoding format is a USB HID encoding format, and the first key code conversion table 2 is a HID code conversion table (as shown in FIG. 6), and the second encoding format is an America Standard Code for Information Interchange (ASCII) code format, and the second key code conversion table 4 is an ASCII code conversion table (as shown in FIG. 7), such that if any hot key 10 of the number pad 1 is pressed as shown in FIG. 8, the number pad 1 and the electronic device 3 are processed by a procedure comprising the following steps:

(Step 100) The number pad 1 transmits all key codes 14 of the key code set 12 corresponding to the pressed hot key 10 according to a predetermined transmitting sequence of the key codes 14 to an electronic device 3 that is connected to the number pad 1.

(Step 110) The electronic device 3 reads each key code 14 according to a USB HID encoding format.

(Step 120) The electronic device 3 converts the key codes 14 into characters corresponding to the HID code conversion table according to the HID code conversion table.

(Step 130) The electronic device 3 identifies a plurality of characters if the electronic device 3 reads the characters, and converts the characters by pressing and holding an "Alt" function key for a period of time and then releasing the "Alt" function key, and the electronic device 3 also identifies at least one number character during the time when the "Alt" function key is pressed, and then the electronic device 3 bases on the decimal parameter formed by the number characters to find out the corresponding character with the same decimal parameter from the ASCII code conversion table.

(Step 140) The electronic device 3 reads the character(s) converted and formed simply by the HID code conversion table, and then the character(s) converted and formed simply by the ASCII code conversion table jointly to produce the expected conversion result, so as to open an application program installed in the electronic device 3.

In view of the description above, the operating system of the electronic device 3 under any language input method converts the key codes 14 by the HID code conversion table and the ASCII code conversion table to avoid using the current language input method, and thus the operating system of the electronic device 3 will not convert the key codes 14 into an unexpected conversion result under a different language input method, and the number pad can start an application program correctly.

Figure 9:
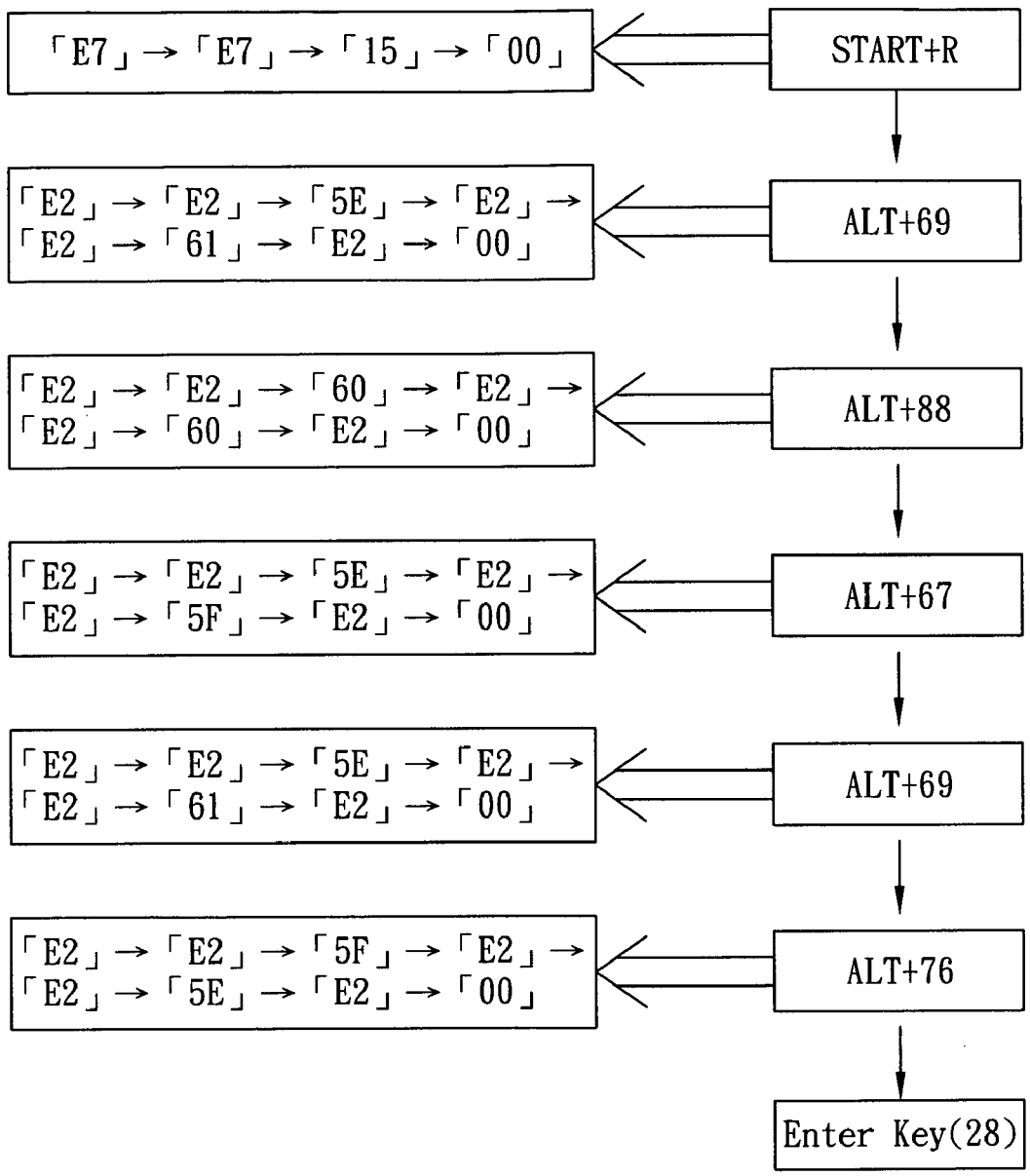
FIG. 9 is a schematic view of expected conversion results of all key codes of a key code set of the "Excel" hot key, and key codes corresponding to each sequence.

Referring to FIG. 9 for executing the function of an "Excel" hot key of a "Cordless Number Pad for Notebooks" 1 manufactured by Logitech in accordance with the present invention, the expected conversion result of the number pad 1 corresponding to all key codes 14 of a key code set 12 of the "Excel" hot key 10 is described as follows:

1. During the time period from pressing to releasing the "START" function key is pressed and released, a "R" character is pressed to start the "EXECUTE" window of the operating system of the electronic device 3, and the "START+R" in FIG. 5 shows that during the time period from pressing to releasing the "START" function key, the "R" character is pressed, wherein "+" shows the time period from pressing and releasing the key instead of the desired input character;
2. During the time period from pressing to releasing the "Alt" function key, the decimal parameter "69" is inputted sequentially, so that the electronic device 3 will find out the "E" character corresponding to the parameter "69" according to the ASCII code conversion table, and the "E" character is inputted into the "START" field of the "EXECUTE" window as shown in FIG. 5, wherein "Alt+ ⨯" shows the decimal parameter inputted sequentially during the time period from pressing to releasing the "Alt" function key, and "+" shows the time period from pressing to releasing the key instead of the desired input character;
3. During the time period from pressing to releasing the "Alt" function key, the decimal parameter "88" is inputted sequentially, so that the electronic device 3 will find out the "X" character corresponding to the parameter "88" according to the ASCII code conversion table, and the "X" character is inputted into the "START" field of the "EXECUTE" window;
4. During the time period from pressing to releasing the "Alt" function key, the decimal parameter "67" is inputted sequentially, so that the electronic device 3 will find out the "C" character corresponding to the parameter "67" according to the ASCII code conversion table, and the "C" character is inputted into the "START" field of the "EXECUTE" window;
5. During the time period from pressing to releasing the "Alt" function key, the decimal parameter "69" is inputted sequentially, so that the electronic device 3 will find out the "E" character corresponding to the parameter "69" according to the ASCII code conversion table, and the "E" character is inputted into the "START" field of the "EXECUTE" window;
6. During the time period from pressing to releasing the "Alt" function key, the decimal parameter "76" is inputted sequentially, so that the electronic device 3 will find out the "L" character corresponding to the parameter "76" according to the ASCII code conversion table, and the "L" character is inputted into the "START" field of the "EXECUTE" window; and
7. The "Enter" function key is inputted, and the electronic device 3 executes the "Excel" in the "EXECUTE" window and starts the Microsoft Office "Excel" application program.

The way for the "Excel" hot key 10 to produce the foregoing expected conversion result by using all corresponding key codes 14 of the key code set 12 according to the foregoing predetermined sequence and list all required transmitting key codes 14 according to each predetermined sequence is described as follows:

(1) The key codes "E7"→"E7"→" 15"→" 00" shows the input of the "15"key code during the time period from pressing to releasing the "START" function key, wherein a plurality of "E7"s shows that the state of continuously pressing the "START" function key, the "15"key code shows an input of "R" character, and "00"key code shows that the "START" function key has been released and no other key code is inputted further;

(2) The key codes "E2"→" E2"→" 5E"→" E2"→" E2"→" 61"→" E2"→" 00" and the foregoing sequence of the key code show that the "6" and "9"characters are inputted sequentially during the time period from pressing to releasing the "Alt" function key to form a decimal parameter "69", wherein a plurality of "E2"key codes shows that "5E" and "61"are mixed into the "E2"key codes when the "Alt" function key is pressed continuously, and it shows that the decimal parameter "69" is inputted, and the "00"key code shows that the "Alt" function key has been released and no more other key code is inputted. The plurality of "E2"key codes in each sequence and the key codes mixed into the "E2"key codes and the "00"key code that follow have the same effects, and thus will not be described anymore;

(3) The key codes "E2"→" E2"→" 60"→" E2"→" E2"→" 60"→" E2"→" 00", and the foregoing sequence of the key codes show that the "8" and "8"characters are inputted sequentially during the time period from pressing to releasing the "Alt" function key to form a decimal parameter "88";

(4) The key codes "E2"→" E2"→" 5E"→" E2"→" E2"→" 5F"→" E2"→" 00"and the foregoing sequence of the key codes show that the "6" and "7"characters are inputted sequentially during the time period from pressing to releasing the "Alt" function key to form a decimal parameter "67";

(5) The key codes "E2"→" E2"→" 5E"→" E2"→" E2"→" 61"→" E2"→" 00"and the foregoing sequence of the key codes show that the "6" and "9"characters are inputted sequentially during the time period from pressing to releasing the "Alt" function key to form a decimal parameter "69";

(6) The key codes "E2"→" E2"→" 5F"→" E2"→" E2"→" 5E"→" E2"→" 00"and the foregoing sequence of the key codes show that the "7" and "6"characters are inputted sequentially during the time period from pressing to releasing the "Alt" function key to form a decimal parameter "76"; and (7) The key code "28" shows that the "Enter" function key is pressed.

Therefore, all key codes 14 of the key code set 12 corresponding to the "Excel" hot key 10 and the transmitting sequence are "E7"→" E7"→" 15"→" 00"→" E2"→" E2"→" 5E"→" E2"→" E2"→" 61"→" E2"→" 00"→" E2"→" E2"→" 60"→" E2"→" E2"→" 60"→" E2"→" 00"→" E2"→" E2"→" 5E"→" E2"→" E2"→" 5F"→" E2"→" 00"→" E2"→" E2"→" 5E"→" E2"→" E2"→" 61"→" E2"→" 00"→" E2"→" E2"→" 5F"→" E2"→" E2"→" 5E"→" E2"→" 00"→" 28".

The foregoing key codes 14 are converted into characters according to the HID code conversion table, which include the "START" function key, the "Enter" function key and the "R" character, wherein the characters converted and formed by the ASCII code conversion table include the "Alt" function key, and the "E", "X", "C", "E" and "L" characters. In other words, the expected conversion result of the operating system of the electronic device 3 in accordance with the present invention is obtained by inputting the "R" character to start the "EXECUTE" window and inputting the string "Excel" into the "START" field of the "EXECUTE" window while the "START" function key is being pressed, so as to complete opening the Microsoft Office "Excel" application program.

In view of the description above, regardless of any language, the operating system of the electronic device 3 can convert the key codes 14 by the HID code conversion table and ASCII code conversion table to avoid using the current language input method of the electronic device 3 for converting the key codes 14, and the operating system can start the function or application program corresponding to the hot key 10 correctly. It is noteworthy to point out that different function keys such as "START" and "Alt" are installed on different positions of the number pad 1, and thus the HID code conversion table includes two different key codes to stand for a function key. In this invention, one of the key codes represents a corresponding function key, but any person skilled in the art can use another key code to represent the same function key, and such arrangement is intended to be covered in the scope of the present invention.

To prevent the operating system of the electronic device 3 converts the key codes 14 into different characters, two keys codes "2A" and "28" can be added in front of the inputted string "Excel" to indicate an input of the function keys "BACKSPACE" and "ENTER", such that before the string "Excel" is inputted into the "START" field of the electronic device 3, the function key "BACKSPACE" with the string previously inputted into the "START" field of the "EXECUTE" window deleted, and then the function key "ENTER" is inputted to assure the cursor stays within the "START" field in order to assure the string "Excel" being inputted into the "START" field.

In this embodiment, the number pad 1 must compulsorily set the number lock key to a state for outputting numbers before the number pad 1 transmits the key code set 12, and the number lock state is resumed after the number pad 1 has transmitted the key code set 12. In general, the lamp signal indicating the number lock state and disposed on the number pad 1 is at a light emitting status, which means that the number lock state is set to a state for outputting numbers or generally called the number lock "ON". If the electronic device 3 is connected to another number pad 5, the number lock state of the number pad 1 and the other number pad 5 are independent with each other, such that after the key code sets 12 are transmitted, the number lock state will be resumed. In this invention, the number pad 1 must compulsorily set the number lock state to a state of outputting numbers before the number pad 1 transmits the key code set 12 mainly for correcting outputting a key code of each number key in a number key area on the right side of a general number pad, during the time period from pressing to releasing the "Alt" function key of the number pad 1, so as to input a decimal parameter instead of the key code for outputting a direction key or a function key. Since the number lock state of the number pad 1 and the other number pad 5 are independent with each other, and the number lock state will be resumed, the related technical measures are disclosed in R.O.C. Pat. Application No. 91118005, and thus will not be described here.

In summation of the description above, the present invention adopts the operating system of Microsoft Windows to demonstrate how to use the key code set 12 of the hot key 10 to open the Microsoft Office "Excel" application program. However, the key code set 12 is not limited to the function of opening the "Excel" application program only, but all key codes of a key code set 12 of the number pad 1 are edited and formed by a first key code conversion table 2 of at least one encoding format, and the key codes 14 will not be converted by the current language input method of the operating system, but will be converted by a key code conversion table of other encoding formats to fit different language input methods of the operating system, so as to achieve the effects of obtaining the same conversion result from the same key codes, and opening an application program or a specific function. It is noteworthy to point out that the number pad of the invention requires no additional driver program installed into the operating system, and the operating system can convert the key code of the key code set 12 into the same expected conversion result.

While the invention has been described by means of specific embodiments, numerous modifications and variations could be made thereto by those skilled in the art without departing from the scope and spirit of the invention set forth in the claims.

What is claimed is:

1. A method of transmitting a key code of a hot key from a number pad, applied in a number pad, and the number pad having at least one hot key, and a plurality of key code sets, and each key code set corresponding to one of the hot keys, and each key code set having a plurality of key codes, and the key codes being formed and edited according to a first key code conversion table in a first encoding format and a predetermined sequence, such that if any hot key of the number pad is pressed, the method will process a procedure comprising the steps of:

the number pad transmitting all key codes of the corresponding key code sets of the pressed hot key according to a predetermined transmitting sequence of the key codes to an electronic device that is connected to the number pad;

the electronic device reading each key code by the first encoding format; and the key codes being converted into characters corresponding to the first key code conversion table according to the first key code conversion table, and a plurality of characters being converted into characters corresponding to the second key code conversion table according to the second key code conversion table in a second encoding format, such that the electronic device produces an expected conversion result simply by reading the characters converted by the first key code conversion table and the characters converted by the first and second key code conversion tables.

2. The method of claim 1, wherein the number pad must compulsorily set a number lock key to a state of outputting a number, before the number pad transmits the key code set.

3. The method of claim 2, wherein when the electronic device is connected to another number pad, the number lock key state of the number pad and the number lock key state of another number pad are independent and will not be affected with each other, and after the key code sets are transmitted, the number lock key state will be resumed.

4. The method of claim 1, wherein the first encoding format is a USB HID encoding format, and the first key code conversion table is a HID code conversion table, and the second encoding format is an ASCII encoding format, and the second key code conversion table is an ASCII code conversion table, such that if any hot key of the number pad is pressed, the number pad will process a procedure comprising the steps of:

the number pad transmitting all key codes of a key code set corresponding to a pressed hot key according to a predetermined transmitting sequence of the key codes to the electronic device according to the predetermined transmitting sequence;

the electronic device reading each key code by a USB HID encoding format;

the electronic device converting each of the key codes into a character corresponding to a character of the HID code conversion table according to the HID code conversion table;

the electronic device identifying a plurality of characters, when the characters are read by the electronic device, and the characters being converted by pressing and holding an "Alt" function key for a period of time, and then releasing the "Alt" function key, and identifying at least one number character while the "Alt" function key of the electronic device is being pressed, and then the electronic device searching for a character with a decimal parameter equal to a binary parameter composed of the number characters from the ASCII code conversion table; and the electronic device producing an expected conversion result jointly by reading a character converted by the HID code conversion table and a character converted by the ASCII code conversion table to open an application program installed in the electronic device.

5. The method of claim 3, wherein the first encoding format is a USB HID encoding format, and the first key code conversion table is a HID code conversion table, and the second encoding format is an ASCII encoding format, and the second key code conversion table is an ASCII code conversion table, such that if any hot key of the number pad is pressed, the number pad will process a procedure comprising the steps of:

the number pad transmitting all key codes of a key code set corresponding to a pressed hot key according to a predetermined transmitting sequence of the key codes to the electronic device according to the predetermined transmitting sequence;

the electronic device reading each key code by a USB HID encoding format;

the electronic device converting each of the key codes into a character corresponding to a character of the HID code conversion table according to the HID code conversion table;

the electronic device identifying a plurality of characters, when the characters are read by the electronic device, and the characters being converted by pressing and holding an "Alt" function key for a period of time, and then releasing the "Alt" function key, and identifying at least one number character while the "Alt" function key of the electronic device is being pressed, and then the electronic device searching for a character with a decimal parameter equal to a binary parameter composed of the number characters from the ASCII code conversion table; and the electronic device producing an expected conversion result jointly by reading a character converted by the HID code conversion table and a character converted by the ASCII code conversion table to open an application program installed in the electronic device.

6. The method of claim 4, wherein the operating system of the electronic device produces an expected conversion result by starting an "EXECUTE" window and inputting a character string into the "START" field of the "EXECUTE" window to complete the operation of opening an application program.

7. The method of claim 5, wherein the operating system of the electronic device produces an expected conversion result by starting an "EXECUTE" window and inputting a character string into the "START" field of the "EXECUTE" window to complete the operation of opening an application program.

* * * * *